US012772229B2

(12) United States Patent
Yoshioka et al.

(10) Patent No.: US 12,772,229 B2
(45) Date of Patent: Oct. 20, 2026

(54) TERMINAL, BASE STATION, AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 387 days.

(21) Appl. No.: 17/794,092

(22) PCT Filed: Feb. 6, 2020

(86) PCT No.: PCT/JP2020/004692
§ 371 (c)(1),
(2) Date: Jul. 20, 2022

(87) PCT Pub. No.: WO2021/157043
PCT Pub. Date: Aug. 12, 2021

(65) Prior Publication Data

US 2023/0102454 A1 Mar. 30, 2023

(51) Int. Cl.
*H04W 72/12* (2023.01)
*H04L 1/1812* (2023.01)
*H04W 72/25* (2023.01)

(52) U.S. Cl.
CPC ........... *H04W 72/12* (2013.01); *H04L 1/1812* (2013.01); *H04W 72/25* (2023.01)

(58) Field of Classification Search
CPC ..... H04W 72/12; H04W 72/25; H04W 72/20; H04W 92/18; H04L 1/1812; H04L 1/1822; H04L 1/1896
See application file for complete search history.

(56) References Cited

U.S. PATENT DOCUMENTS

2015/0305003 A1* 10/2015 Chen ..................... H04L 1/1822 370/330
2017/0346602 A1 11/2017 Zeng et al.
2019/0181990 A1 6/2019 Yasukawa et al.
(Continued)

FOREIGN PATENT DOCUMENTS

CN 109075923 A 12/2018
JP 2019169750 A 10/2019
(Continued)

OTHER PUBLICATIONS

Extended European Search Report issued in counterpart European Application No. 20918097.5 mailed on Sep. 13, 2023 (7 pages).
(Continued)

*Primary Examiner* — Kan Yuen
(74) *Attorney, Agent, or Firm* — Osha Bergman Watanabe & Burton LLP

(57) ABSTRACT

A terminal includes a receiver that receives schedule information for a sidelink communication; and a controller that executes at least one operation of setting a New Data Indicator (NDI) and/or a Hybrid Automatic Repeat Request process number (HPN) to be included in control information for the sidelink communication based on a NDI and/or a HPN included in the schedule information, or autonomously setting an NDI and an HPN to be included in the control information for the sidelink communication independently of the NDI and the HPN included in the schedule information.

5 Claims, 11 Drawing Sheets

(56) References Cited

U.S. PATENT DOCUMENTS

| | | | | |
|---|---|---|---|---|
| 2020/0029318 | A1* | 1/2020 | Guo | H04L 1/1854 |
| 2020/0275474 | A1* | 8/2020 | Chen | H04L 1/1607 |
| 2020/0304247 | A1* | 9/2020 | Loehr | H04W 72/23 |
| 2020/0404706 | A1* | 12/2020 | Karaki | H04L 1/1883 |
| 2021/0127416 | A1 | 4/2021 | Matsumura et al. | |
| 2021/0297222 | A1 | 9/2021 | Zhu | |
| 2021/0376962 | A1* | 12/2021 | Thomas | H04L 1/1864 |
| 2021/0400687 | A1* | 12/2021 | Yeo | H04L 1/0061 |
| 2022/0022021 | A1* | 1/2022 | Bi | H04W 4/90 |
| 2022/0109532 | A1* | 4/2022 | Talarico | H04L 27/0006 |
| 2022/0183002 | A1* | 6/2022 | Yeo | H04L 1/1854 |
| 2022/0232613 | A1* | 7/2022 | Gao | H04L 1/1887 |
| 2022/0386252 | A1* | 12/2022 | Lee | G01S 19/256 |
| 2022/0416950 | A1* | 12/2022 | Xu | H04L 1/1812 |
| 2023/0026196 | A1* | 1/2023 | Yang | H04L 1/1854 |

FOREIGN PATENT DOCUMENTS

| | | | |
|---|---|---|---|
| WO | 2016131194 | A1 | 8/2016 |
| WO | 2020003442 | A1 | 1/2020 |

OTHER PUBLICATIONS

H. Huawei; "Discussion on HARQ support for NR sidelink"; 3GPP TSG-RAN WG2 #107bis, R2-1913701; Chongqing, China; Oct. 14-18, 2019 (17 pages).
Office Action issued in the counterpart Chinese Application No. 202080095414.0, mailed Mar. 18, 2024 (20 pages).
Lenovo et al.; "SL HARQ operation"; 3GPP TSG RAN WG2 Meeting #107, R2-1910086; Prague, Czech Republic; Aug. 26-30, 2019 (4 pages).
International Search Report issued in Application No. PCT/JP2020/004692 mailed on Aug. 4, 2020 (3 page).
Written Opinion issued in Application No. PCT/JP2020/004692 mailed on Aug. 4, 2020 (3 page).
3GPP TS 38.300 V16.0.0, "3rd Generation Partnership Project; Technical Specification Group Radio Access Network; NR; NR and NG-RAN Overall Description; Stage 2 (Release 16)" Dec. 2019 (101 pages).
Lenovo, Motorola Mobility, "SL HARQ protocol operation", 3GPP TSG RAN WG2 Meeting #108, R2-1915106, Reno, USA, Nov. 18-22, 2019 (6 pages).
ITL, "Sidelink HARQ operation in mode 1", 3GPP TSG-RAN WG2 Meeting #108, R2-1916130, Reno, USA, Nov. 18-22, 2019 (3 pages).
Office Action issued in the counterpart Japanese Application No. 2021-575543, mailed Feb. 12, 2024 (5 pages).
Lenovo, Motorola Mobility: "Discussion on resource allocation for NR sidelink Mode 1", 3GPP TSG RAN WG1 #99, R1-1912323; Reno, USA, Nov. 18-22, 2019 (9 pages).
OPPO: "Left Issues for configured SL grant", 3GPP TSG-RAN WG2 Meeting #107, R2-1908722; Prague, Czech, Aug. 26-30, 2019 (4 pages).
Office Action issued in Japanese Application No. 2021-575543, dated Jul. 23, 2024 (4 pages).
3GPP TS 38.212 V16.0.0 "3rd Generation Partnership Project; Technical Specification Group Radio Access Network; NR; Multiplexing and channel coding (Release 16)" Dec. 2019 (145 pages).
Office Action issued in Chinese Application No. 202080095414.0; Dated Oct. 31, 2024 (15 pages).
Office Action issued in Chinese Application No. 202080095414.0; Dated Aug. 14, 2024 (17 pages).

* cited by examiner

FIG.4

| | SCI format 0-1 |
|---|---|
| For sensing | Priority |
| For sensing | Period |
| For sensing | Time resource |
| For sensing | Freq. resource |
| | DM-RS pattern |
| | 2nd stage SCI format |
| | Beta offset indicator |
| | No. of DM-RS ports |
| | MCS |
| | Reserved |

| | SCI format 0-2 |
|---|---|
| | L1 source ID |
| | L1 destination ID |
| For decoding | HPN |
| For decoding | NDI |
| | RV |
| | CSI request |
| | Zone ID |
| | Commun. range requirement |

FIG.5

| DCI format 3_0 |
|---|
| HPN |
| NDI |
| Time gap (PDCCH to PSCCH/PSSCH) |
| Lowest sub-channel index |
| Freq. resource |
| Time resource |
| Time gap (PSFCH to PUCCH) |
| PUCCH resource indicator |
| CG config. index |

TERMINAL, BASE STATION, AND COMMUNICATION METHOD

TECHNICAL FIELD

The present invention relates to a terminal, a base station, and a communication method in a radio communication system.

BACKGROUND ART

For Long Term Evolution (LTE) and LTE successor systems (e.g., LTE-Advanced (LTE-A) and New Radio (NR) (which is also referred to as 5G)), sidelink (which is also referred to as Device to Device (D2D)) technology has been studied in which terminals, such as User Equipment (UE), communicate directly with each other without going through a base station.

In addition, implementation of Vehicle to Everything (V2X) has been studied and technical specifications have been developed. Here, V2X is a part of Intelligent Transport Systems (ITS) and V2X is a generic term for Vehicle to Vehicle (V2V), which implies a communication mode executed between vehicles; Vehicle to Infrastructure (V2I), which implies a communication mode executed between a vehicle and a road-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

RELATED ART DOCUMENT

Non-Patent Document

Non-Patent Document 1: 3GPP TS 38.300 V16.0.0(2019-12)

SUMMARY OF THE INVENTION

Problem to be Solved by the Invention

When a base station transmits a DCI to a terminal and the terminal transmits an SCI on a scheduled sidelink resource, it is expected that the DCI includes an HPN and an NDI and the SCI includes an HPN and an NDI.

There is a need for clarifying the relationship between the HPN and the NDI included in the DCI and the HPN and the NDI included in the SCI.

Means for Solving the Problem

According to an aspect of the present invention, there is provided a terminal including a receiver that receives schedule information for a sidelink communication; and a controller that executes at least one operation of setting an NDI and/or an HPN to be included in control information for the sidelink communication based on a New Data Indicator (NDI) and/or a Hybrid Automatic Repeat Request process number (HPN) included in the schedule information, or autonomously setting an NDI and an HPN to be included in the control information for the sidelink communication independently of the NDI and the HPN included in the schedule information.

Advantage of the Invention

According to an embodiment, relationship between an HPN and an NDI included in a DCI and an HPN and an NDI included in an SCI is clarified.

BRIEF DESCRIPTION OF DRAWINGS

FIG. 4 is a diagram illustrating an example of an SCI.

FIG. 5 is a diagram illustrating an example of DCI format 3_0.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of inter-terminal direct communication according to the embodiments is assumed to be LTE or NR sidelink (SL (Sidelink)), but the method of inter-terminal direct communication is not limited to this method. Additionally, the name "sidelink" is an example and Uplink (UL) may include a function of SL without using the name "sidelink." SL may be distinguished from Downlink (DL) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used for synchronization (PSS/SSS/PSSS/SSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In the embodiments, it is mainly assumed that a terminal (which may be referred to as user equipment (UE)) is installed in a vehicle, but embodiments of the present invention are not limited to this configuration. For example, a terminal may be a terminal carried by a person, a terminal may be a device installed in a drone or an aircraft, or a terminal may be a base station, an RSU, a relay station (relay node), a user equipment having a scheduling capability, or the like. Furthermore, the embodiments are not limited to the terminal and the base station, and it suffices if the devices are communication devices.

(System Configuration)

Figure 1:
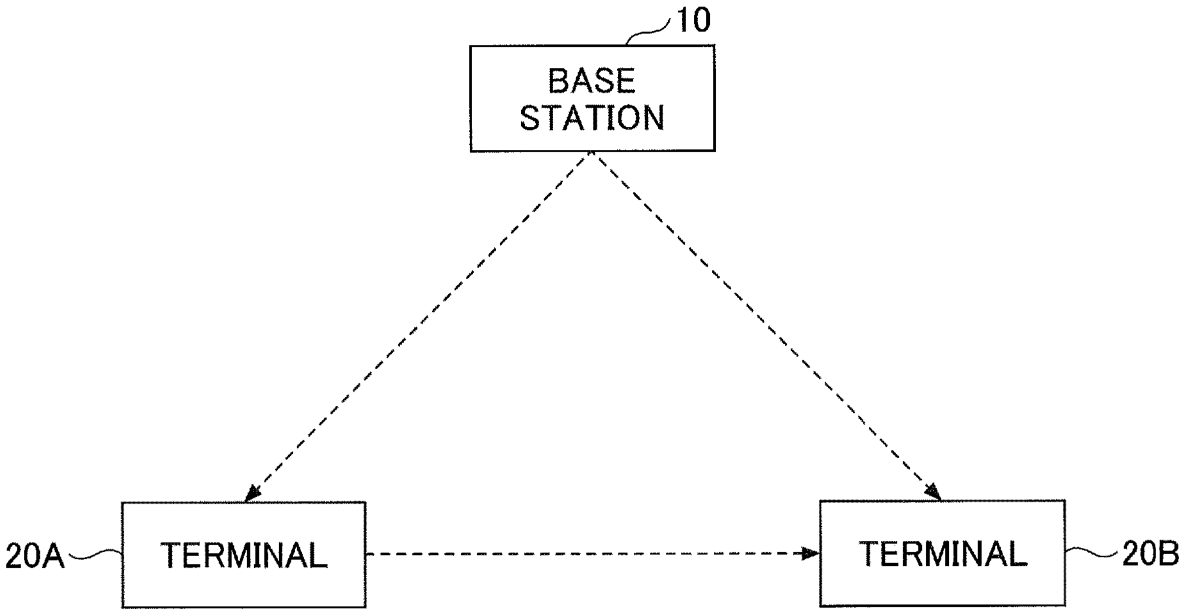
FIG. 1 is a diagram illustrating an example of a configuration of a radio communication system according to an embodiment.

FIG. 1 is a diagram illustrating an example of a configuration of a radio communication system according to an embodiment. As illustrated in FIG. 1, a radio communication system according to the embodiment includes a base station 10, a terminal 20A, and a terminal 20B. Note that, in practice, there may be a large number of terminals, but FIG. 1 illustrates the terminal 20A and the terminal 20B as an example.

In FIG. 1, the terminal 20A is intended to be the transmitting side and the terminal 20B is intended to be the receiving side. However, each of the terminal 20A and the terminal 20B is provided with both transmission function and reception function. In the following, when the terminals 20A, 20B, and the like are not particularly distinguished, it is simply described as the terminal 20 or the terminal. In FIG. 1, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In the embodiments, the terminal 20 is, for example, a device installed in a vehicle such as an automobile and has a function of cellular communication as a User Equipment (UE) in the LTE or NR and a sidelink function. Additionally, the terminal 20 includes functions, such as a GPS device, a camera, various types of sensors, for obtaining report information (location, event information, or the like). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration or resource allocation). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14.

New Radio (NR) sidelink (SL) communication supports HARQ operation with Hybrid automatic repeat request (HARQ) feedback.

(RA Mode 1)

Figure 2:
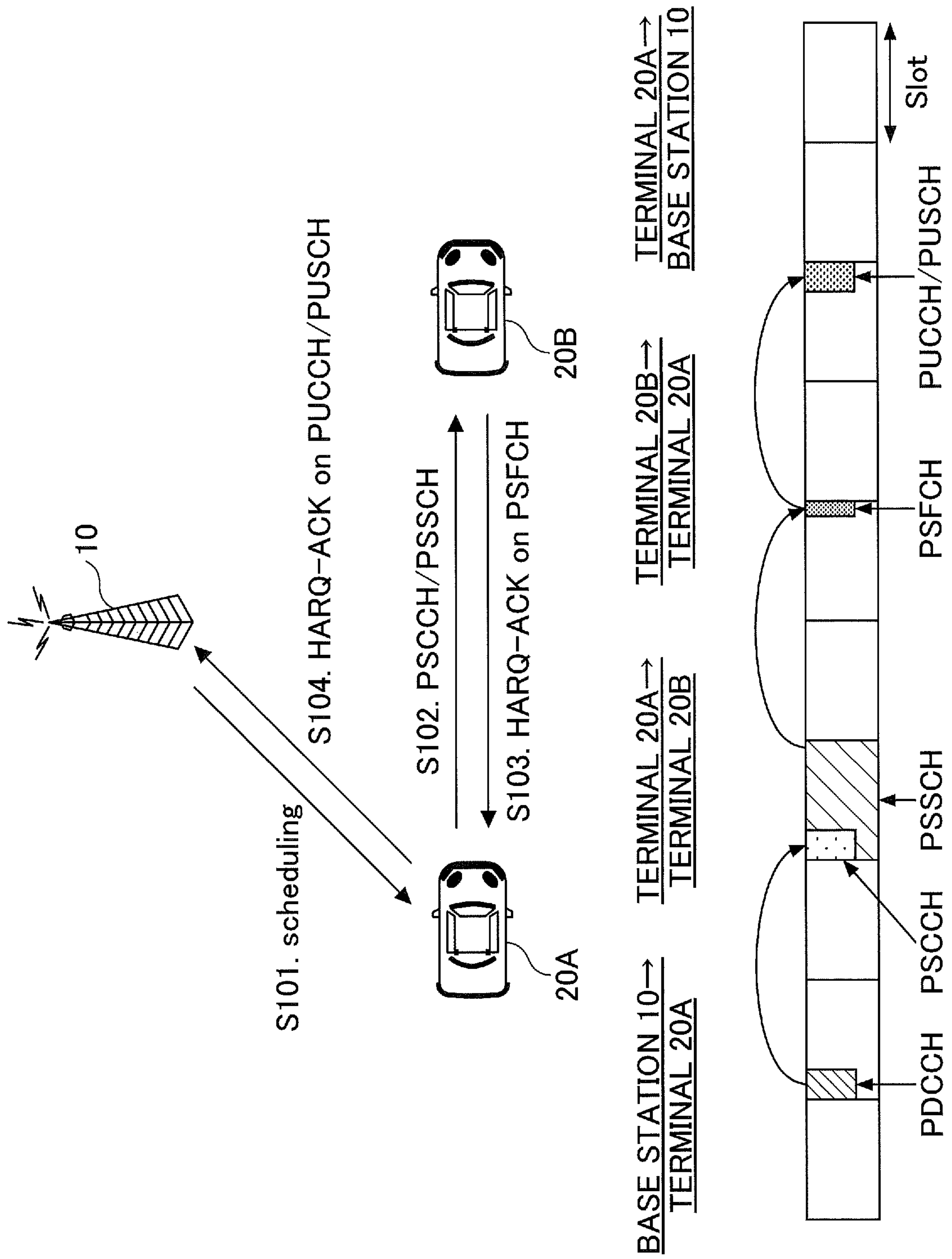
FIG. 2 is a diagram illustrating an example of RA mode 1 of NR sidelink communication.

FIG. 2 is a diagram illustrating an outline of the Resource Allocation (RA) mode 1 (which may be called SL transmission mode 1, for example) of the NR sidelink communication. Note that the RA mode 1 according to the present invention may be a case where the base station controls at least one of the sidelink transmission or sidelink reception of the terminal, and the name is not limited the RA mode 1.

In the case of RA mode 1 that can be used for NR SL communication, as illustrated in FIG. 2, the transmitting terminal 20A is expected to transmit the sidelink HARQ-ACK to the base station 10 (gNB). In the present invention, "Sidelink HARQ-ACK" may mean a HARQ-ACK corresponding to a sidelink channel and/or a sidelink resource. More specifically, for example, as illustrated in FIG. 2, the base station 10 schedules the terminal 20A (S101), and the terminal 20A transmits a transport block to the terminal 20B on PSCCH/PSSCH (S102). The terminal 20B transmits feedback to the terminal 20A for the transmission of the transport block on the PSCCH/PSSCH (S103), and based on this, the terminal 20A transmits a feedback of the HARQ-ACK to the base station 10 (S104). For example, the terminal 20A may relay the HARQ-ACK (acknowledgement (ACK) or negative-acknowledgement (NACK)) received from the terminal 20B to the base station 10.

(HARQ Process Number)

In the HARQ processing, the HARQ process number (HPN) and the New Data Indicator (NDI) are used in NR-Uu (an interface between the user equipment and the base station). It is assumed that HPN and NDI are also used in HARQ operation in NR sidelink communication.

An outline of HARQ processing of NR-Uu is described with reference to FIG. 3.

HPN is a process number for parallel processing of HARQ processes. A HPN may be replaced with a HARQ process ID. If the maximum HPN is 1, the transmitting side transmits data on the Physical Downlink Shared Channel (PDSCH), the receiving side receives the data, determines an error in the data reception, and transmits a feedback of the reception result to the transmitting side. In this case, when the content of the feedback is ACK (positive acknowledgement), the next data is to be transmitted. In this case, since the next data cannot be transmitted until the data is successfully received, latency in the radio section may increase. In order to avoid such latency, HPNs for parallel processing of HARQ processes are used. A HPN indicates a number that represents a HARQ process, from among multiple HARQ processes that are processed in parallel.

The NDI is used by the transmitting side to indicate, after receiving ACK, whether the next data to be transmitted is new data or retransmitted data. NDI is a 1-bit field and, if the current state has been changed (toggled) compared to the previous state, the scheduled data transmission on PDSCH is the initial transmission (transmission of new data). If NDI is not toggled, the scheduled data transmission on PDSCH is a retransmission.

Figure 3:
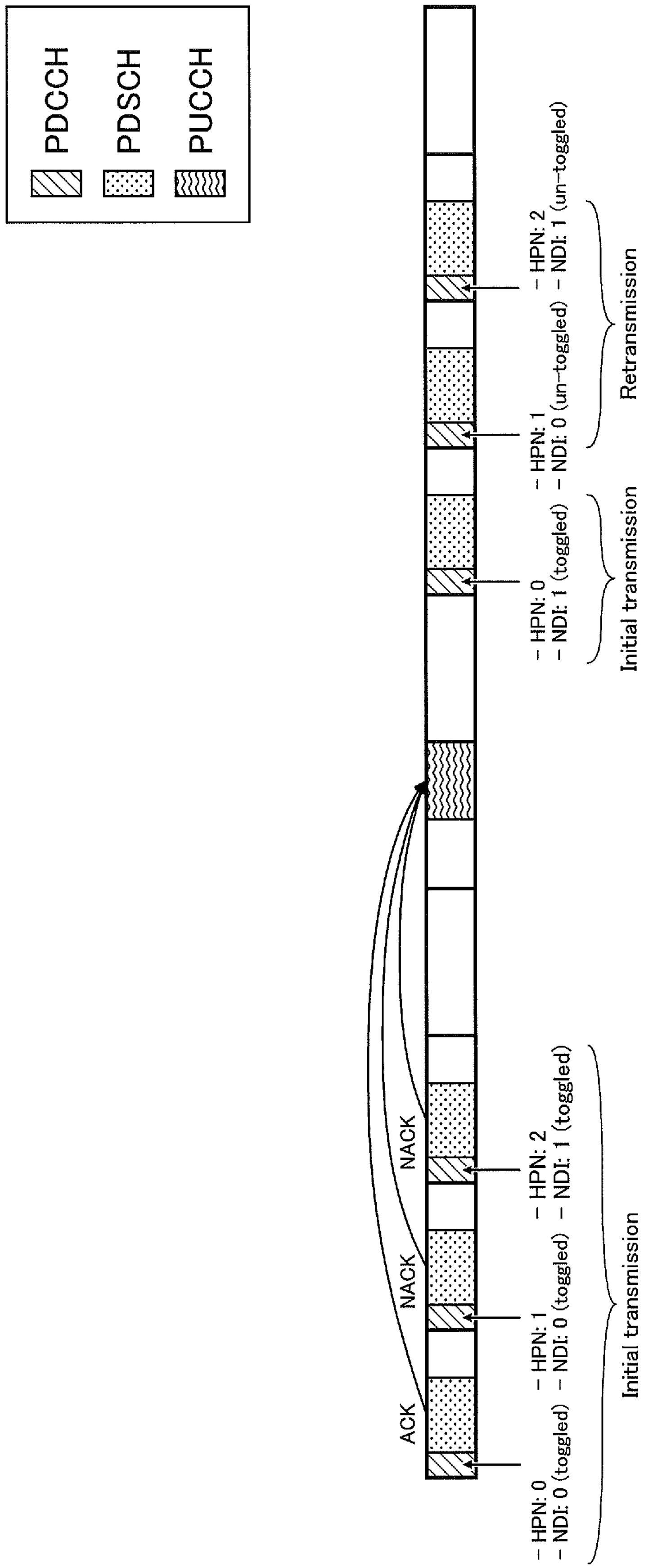
FIG. 3 is a diagram illustrating an example of HARQ processing of NR-Uu.

As illustrated in FIG. 3, for example, suppose that the NDI of HPN0 is 0 and toggled, the NDI of HPN1 is 0 and toggled, and the NDI of HPN2 is 1 and toggled. In this case, the transmission of the data of HPN0 is the first transmission of the data. The transmission of the data of the HPN1 is the first transmission of the data. The transmission of the data of HPN2 is also the first transmission of the data.

As illustrated in FIG. 3, when the receiving side successfully receives the data of HPN0, an ACK is transmitted from the receiving side to the transmitting side. As a result, the NDI of HPN0 becomes 1 in the next downlink transmission. Namely, the NDI of HPN0 is toggled. When an error is detected in the reception of the data of the HPN1 at the receiving side, a NACK is transmitted from the receiving side to the transmitting side. As a result, the NDI of the HPN1 becomes 0 in the next downlink transmission. Namely, the NDI of HPN1 is not toggled. Furthermore, when an error is detected in the reception of the data of the HPN2, a NACK is transmitted from the receiving side to the transmitting side. As a result, the NDI of the HPN2 becomes 1 in the next downlink transmission. Namely, the NDI of HPN2 is not toggled. Accordingly, after the first data is received, the next data is received for HPN0. For each of HPN1 and HPN2, the retransmitted data is received. For example, if there is a failure in the reception of HARQ-ACK by the base station, an operation other than the above-described operation may be performed. For example, even if the receiving side has successfully received the data of HPN0 and the ACK has been transmitted from the receiving side to the transmitting side, the NDI of HPN0 may be 0 in the next downlink transmission.

In the case of RA mode 1, the HARQ process of the sidelink communication can be controlled (indicated) by the base station 10.

FIG. 4 is a diagram illustrating an example of Sidelink Control Information (SCI). As illustrated in FIG. 4, the SCI format 0-2 (the second stage SCI of the two-stage SCI) includes an HPN field (HARQ process ID field) and an NDI field.

FIG. 5 is a diagram illustrating an example of the Downlink Control Information (DCI) format 3_0. The DCI format 3_0 is a DCI for scheduling NR sidelink communication. As illustrated in FIG. 5, the DCI format 3_0 includes an HPN field (HARQ process ID field) and an NDI field.

For example, the base station 10 may schedule NR sidelink communications by the terminal 20A by using a DCI format 3_0, and the terminal 20A may send an SCI format 0-1 and an SCI format 0-2 in a sidelink on a scheduled sidelink resource.

Problem

As described above, for example, in a case where the base station 10 transmits a DCI format 3_0 to the terminal 20A and the terminal 20A transmits the SCI format 0-1 and the SCI format 0-2 on the scheduled sidelink resource, the relationship between the value of the HARQ process ID and the value of NDI included in the DCI format 3_0 and the value of the HARQ process ID and the value of NDI included in the SCI format 0-2 is unknown.

Figure 6:
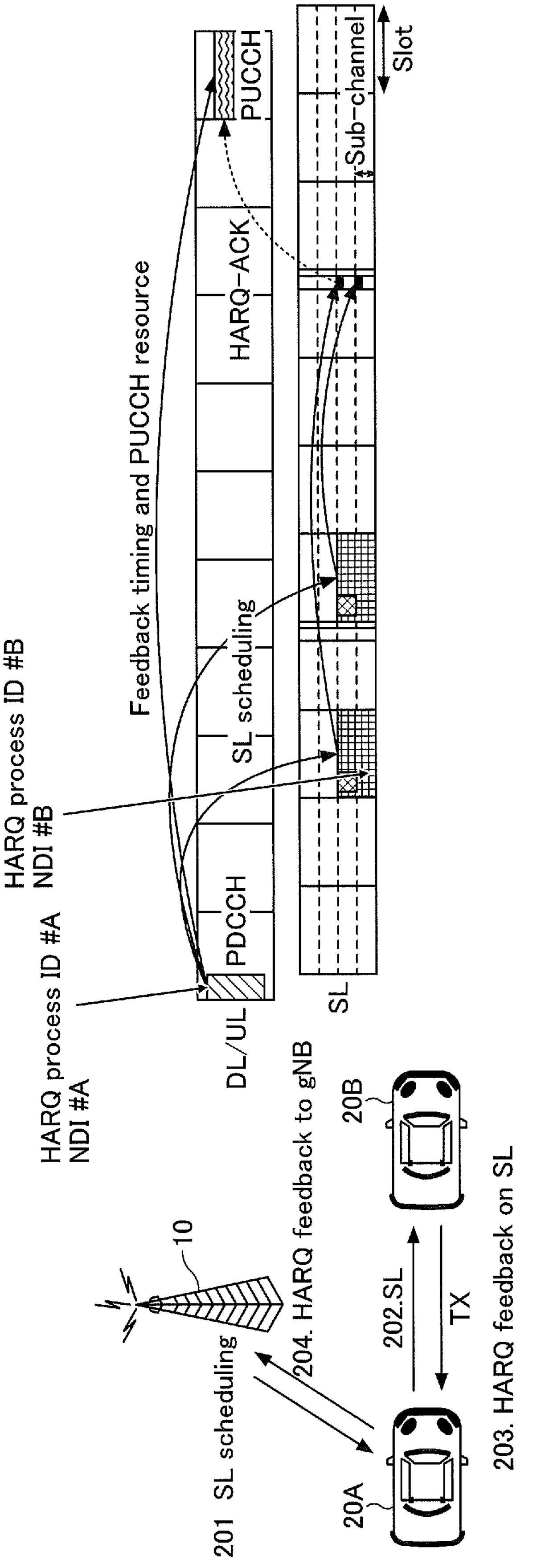
FIG. 6 is a diagram illustrating an example in which a terminal transmitting an SCI format 0-1 and an SCI format 0-2.

For example, as illustrated in FIG. 6, in step S201, the base station 10 schedules sidelink communication of the terminal 20A by using the DCI format 3_0. In step S202, the terminal 20A transmits the SCI format 0-1 and the SCI format 0-2 to the terminal 20B. In step S203, the terminal 20B feeds back the HARQ of the sidelink communication to the terminal 20A. In step S204, the terminal 20A performs HARQ feedback to the base station 10 in NR Uu.

In this case, for example, suppose that, in step S201, the value of HARQ process ID included in the DCI format 3_0 transmitted from the base station 10 to the terminal 20A is HARQ process ID #A and the value of NDI is NDI #A. In this case, for example, suppose that, in step S202, the value of HARQ process ID included in the SCI format 0-2 transmitted from the terminal 20A to the terminal 20B is HARQ process ID #B and the value of NDI is NDI #B. In this case, for example, it is unknown whether HARQ process ID #A=HARQ process ID #B. It is also unclear how the terminal 20A and/or terminal 20B should operate when the NDI in DCI format 3_0 is toggled.

Proposal

For example, the terminal 20 that has received a DCI from the base station 10 may perform at least one operation of (i) selecting a HARQ process ID value and/or an NDI value to be included in the SCI based on the HARQ process ID value and/or the NDI value included in the received DCI, or (ii) selecting a HARQ process ID value and/or an NDI value to be included in the SCI independently of the HARQ process ID value and/or the NDI value included in the received DCI.

(Proposal A)

For example, the terminal 20 that has received the DCI from the base station 10 may select a HARQ process ID value and/or an NDI value to be included in the SCI based on the HARQ process ID value and/or the NDI value included in the received DCI.

(A-1)

For example, the terminal 20 that has received a DCI from the base station 10 may transmit new data on a sidelink resource scheduled by the DCI if the NDI included in the received DCI is toggled. In this case, for example, the terminal 20 may determine the destination and HPN of the new data. That is, the terminal 20 may set a destination of the new data to the destination that is the same as the destination to which the previous data prior to the new data has been transmitted, or the terminal 20 may set a destination of the new data to a different destination.

For example, the terminal 20 that has received the DCI from the base station 10 may select data to be transmitted and a destination of the data when the NDI included in the received DCI is toggled. The terminal 20 may also select, on a per destination basis, a HARQ process ID value to be included in the SCI to be transmitted from among candidate values that can be used.

Figure 7:
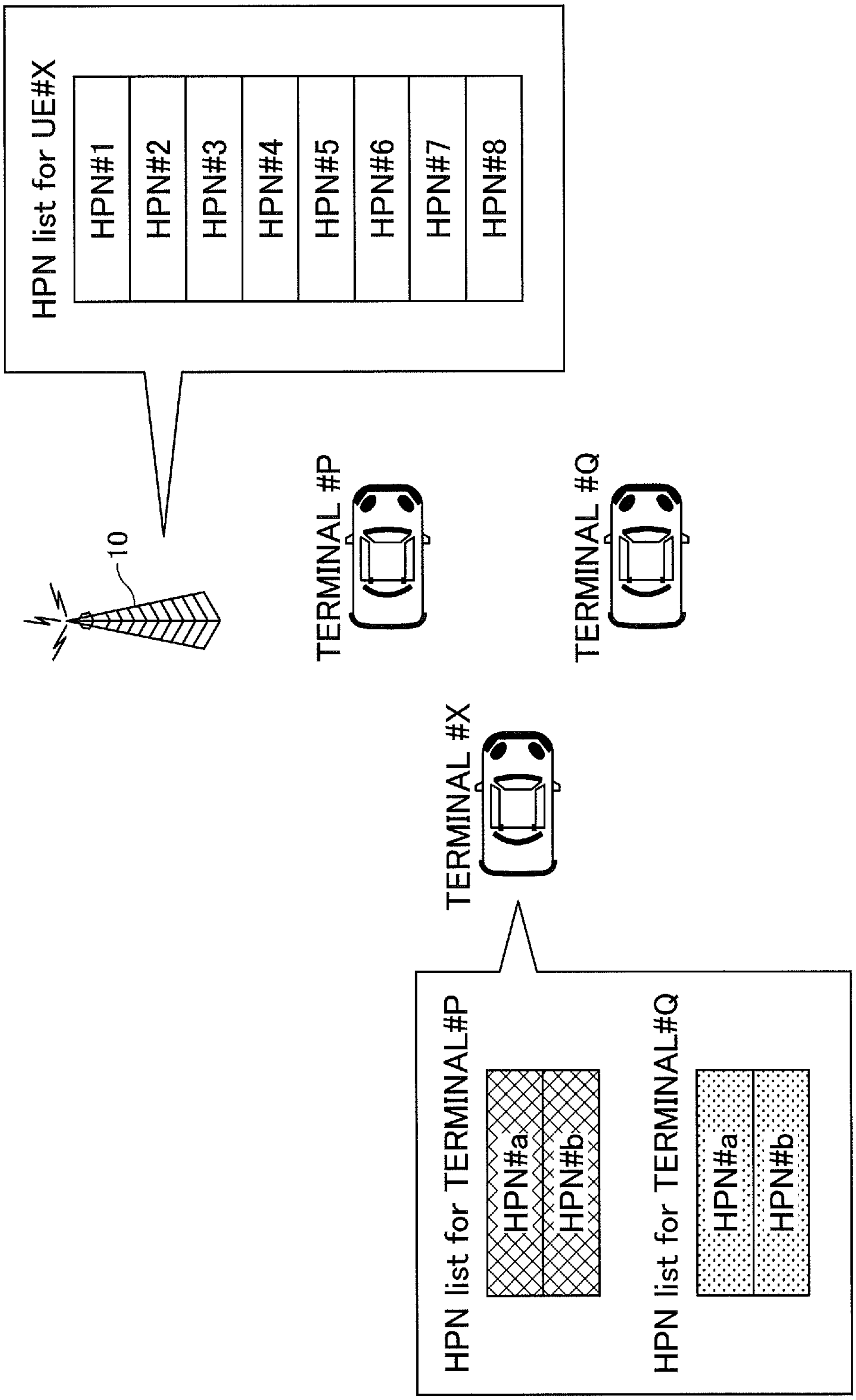
FIG. 7 is a diagram illustrating an example in which a terminal has a plurality of usable HPNs per destination.

FIG. 7 is a diagram illustrating an example in which the terminal #X has a plurality of usable HPNs (HARQ process IDs) on a per destination basis. In the case illustrated in FIG. 7, for example, the terminal #X which has received the DCI from the base station 10 may select to transmit data from the terminal #X to the terminal #Q if the NDI included in the received DCI is toggled, and the terminal #X may select one of HPN #a or HPN #b as the HPN for transmission to the terminal #Q.

For example, the terminal 20 that has received the DCI from the base station 10 may toggle the value of the NDI in the SCI to be transmitted from the value of the NDI in the previous SCI having the same destination and the same HPN if the NDI included in the received DCI is toggled.

Figure 8:
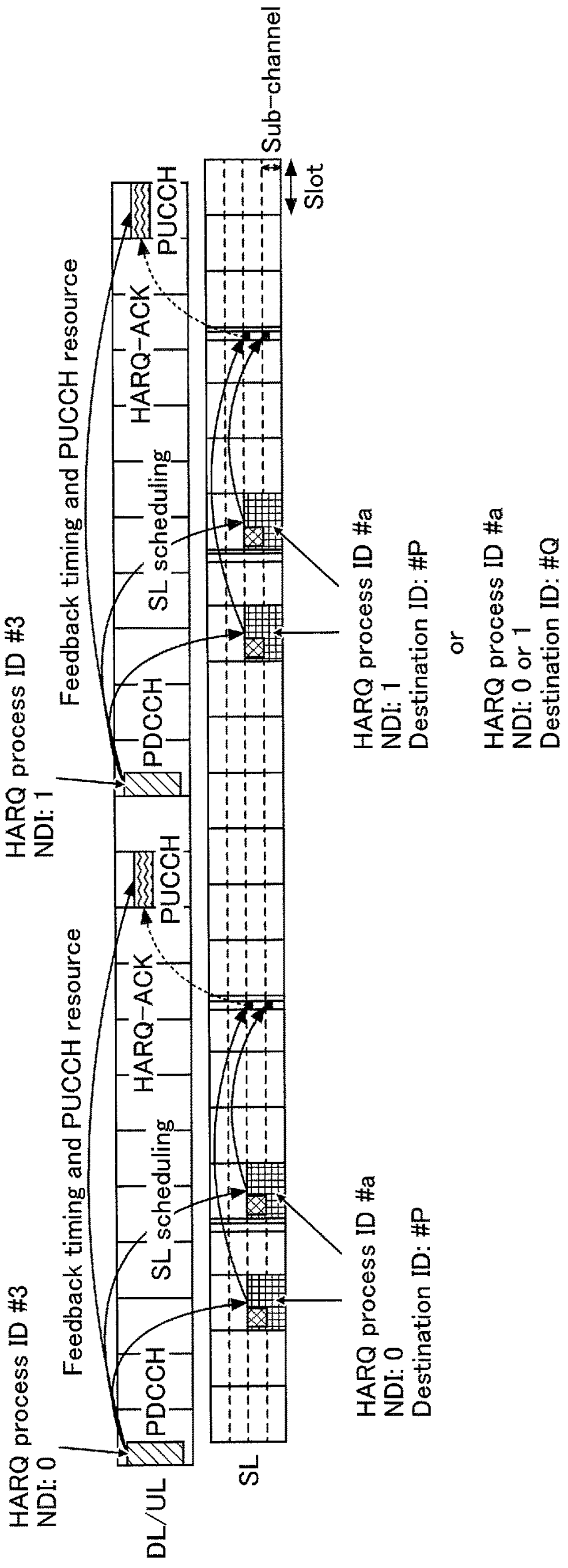
FIG. 8 is a diagram illustrating an example of a DCI in which an NDI in a target HPN is toggled.

FIG. 8 is a diagram illustrating an example of a case in which the NDI in the target HPN is toggled in the DCI. As illustrated in the example of FIG. 8, for example, suppose that the HARQ process ID is #3 and the NDI is 0 in the DCI transmitted by the PDCCH placed ahead in time. Suppose that the HARQ process ID included in the SCI scheduled by the DCI is #a, the NDI is 0, and the destination of the SCI is the terminal #P.

In this regard, suppose that the HARQ process ID is #3 and the NDI is 1 in the DCI transmitted by the PDCCH placed behind with respect to time in the example of FIG. 8. In other words, suppose that NDI is toggled. Since the NDI of the DCI is toggled, either the terminal #P or the terminal #Q may be selected as the destination of the SCI transmitted on the sidelink resource scheduled by the DCI. For example, when the terminal #P is selected, since the value of NDI at the previous transmission of the SCI to the terminal #P is 0, the value of NDI at the current transmission of the SCI may be 1. For example, when the terminal #Q is selected, an SCI having the HARQ process ID of #a and the destination ID of #Q is detected in past data, and, depending on whether the NDI included in the detected SCI is 0 or 1, the value of the NDI at the current transmission of the SCI may be set to a value toggled from the value of the NDI included in the detected SCI.

(A-1')

For example, the terminal 20 that has received a DCI from a base station 10 may retransmit data on a sidelink resource scheduled by the received DCI, if the NDI included in the received DCI is toggled. In this case, the terminal 20 may select the transport block (TB) to be retransmitted. Alternatively, data to be transmitted on a sidelink resource scheduled by the received DCI and the destination of the data may be the same as the previous data transmitted on the sidelink resource scheduled by the preceding DCI having the HPN that is the same as that of the received DCI and the destination of the previous data.

(A-2)

For example, if an NDI included in a received DCI is not toggled, the terminal 20 that has received the DCI from the base station 10 may set at least one of data to be transmitted on a sidelink resource scheduled by the received DCI or the destination of the data to be the same as the previous data transmitted on the sidelink resource scheduled by the preceding DCI having the HPN that is the same as that of the received DCI or the destination of the previous data. In this case, a value of an HPN, a value of an NDI, and a value of a destination ID in a SCI to be transmitted on the sidelink resource scheduled by the received DCI may be the same as the value of the HPN, the value of the NDI, and the value of the destination ID in the previous SCI transmitted on the sidelink resource scheduled by the preceding DCI having the same HPN as that of the received DCI, respectively.

Figure 9:
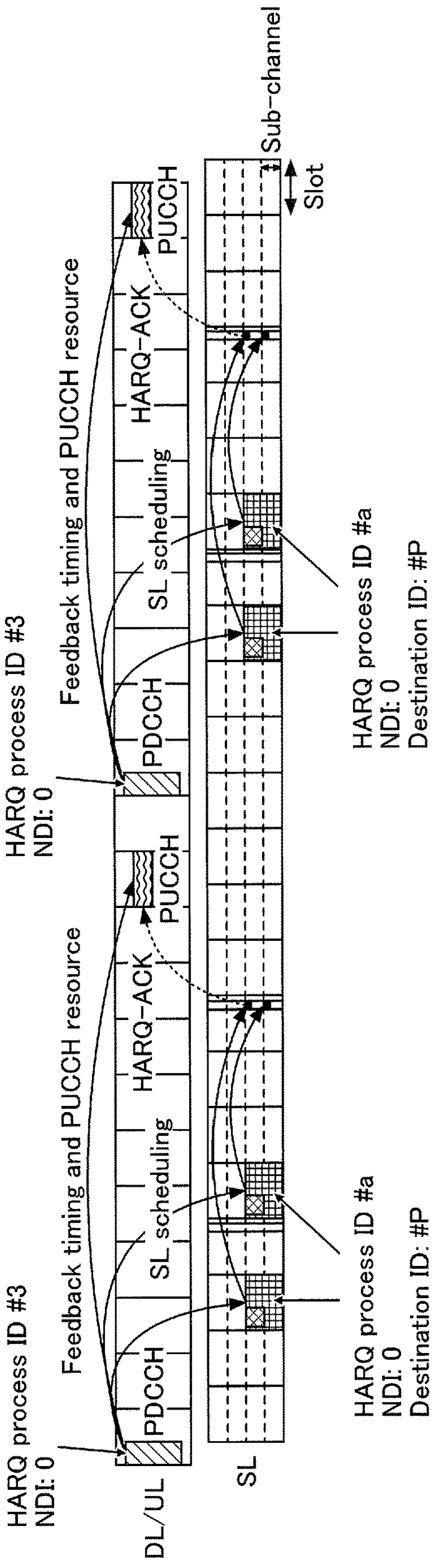
FIG. 9 is a diagram illustrating an example in which an NDI in a target HPN is not toggled in the DCI.

FIG. 9 is a diagram illustrating an example of a case in which the NDI in the target HPN is not toggled in the DCI. As illustrated in the example of FIG. 9, for example, suppose that the HARQ process ID is #3 and the NDI is 0 in the DCI transmitted by the PDCCH placed ahead in time. Suppose that the HARQ process ID included in the SCI scheduled by the DCI is #a, the NDI is 0, and the destination of the SCI is the terminal #P.

In this regard, suppose that the HARQ process ID is #3 and the NDI is 0 in the DCI transmitted by the PDCCH placed behind with respect to time in the example of FIG. 9. In other words, suppose that the NDI is not toggled. Since the NDI of the DCI is not toggled, a HARQ process ID for a transmission of an SCI transmitted on a sidelink resource scheduled by the DCI may be set to #a, the NDI may be set to 0, and the destination of the SCI may be set to the terminal #P.

According to Proposal A described above, a method of controlling HPN and NDI in RA mode 1 can be clarified. Furthermore, the base station 10 can control the retransmission by the terminal 20 in the sidelink communication.

(Proposal B)

For example, the terminal 20 that has received a DCI from the base station 10 may select a value of a HARQ process ID and a value of an NDI to be included in a SCI based on the value of the HARQ process ID and the value of the NDI included in the received DCI.

(B-1)

For example, if an NDI included in a received DCI is toggled, the terminal 20 that has received the DCI from the base station 10 may transmit new data on a sidelink resource scheduled by the DCI. In this case, for example, the terminal 20 may select a destination and/or a HPN of the new data based on the corresponding DCI. For example, the terminal 20 may select a receiving terminal 20 associated with the HPN selected by the terminal 20 based on the corresponding DCI, as the destination of the new data.

For example, the correspondence between the HPN and the destination in the sidelink communication may be configured by the base station 10 or the terminal 20. When the terminal 20 configures the correspondence between the HPN and the destination in the sidelink communication, the terminal 20 may transmit, to the base station 10, a notification of information indicating the configured correspondence between the HPN and the destination in the sidelink communication.

For example, if an NDI included in a received DCI is toggled, the terminal 20 that has received the DCI from the base station 10 may use the value of the NDI included in the received DCI, as a value of an NDI to be included in an SCI to be transmitted on the sidelink resource scheduled by the received DCI.

Figure 10:
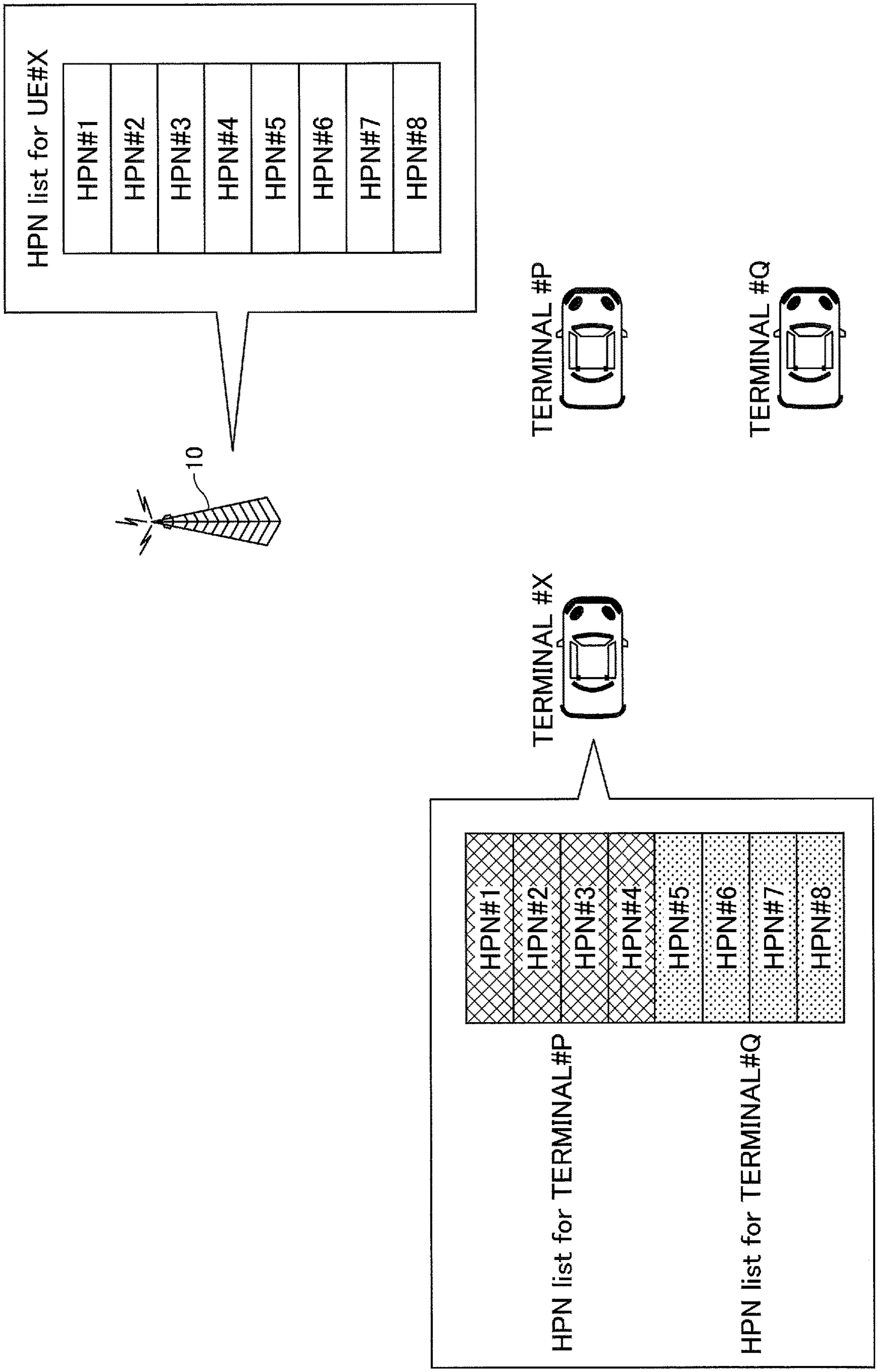
FIG. 10 is a diagram illustrating an example in which a base station controls a destination of a sidelink transmission by a terminal.

FIG. 10 is a diagram illustrating an example in which the base station 10 controls a destination of a sidelink transmission by the terminal #X. As illustrated in the HPN list for the terminal #P and the HPN list for the terminal #Q in the example of FIG. 10, the correspondence relationship between the HPN and the destination of the sidelink communication may be predefined. In the example of FIG. 10, the destination of the sidelink communication corresponding to HPNs #1 to #4 is the terminal #P, and the destination of the sidelink communication corresponding to HPNs #5 to #8 is the terminal #Q. In the example of FIG. 10, the base station 10 can specify the destination of the data to be transmitted on the sidelink resource scheduled by the DCI by specifying a value of an HPN from among HPNs #1 to #8 in the DCI. For example, when the base station 10 specifies HPN #1 in the DCI, the destination of data to be transmitted on the sidelink resource scheduled by the DCI is the terminal #P.

(B-2)

For example, if an NDI included in a received DCI is not toggled, the terminal 20 that has received DCI from the base station 10 may set data to be transmitted on a sidelink resource scheduled by the received DCI and the destination of the data to be the same as the previous data transmitted on the sidelink resource scheduled by the preceding DCI having the HPN that is the same as that of the received DCI and the destination of the previous data. In this case, a value of an HPN, a value of an NDI, and a value of a destination ID in a SCI to be transmitted on the sidelink resource scheduled by the received DCI may be the same as the value of the HPN, the value of the NDI, and the value of the destination ID in the previous SCI transmitted on the sidelink resource scheduled by the preceding DCI having the same HPN as that of the received DCI, respectively.

According to Proposal B described above, the method of controlling HPN and NDI in RA mode 1 can be clarified. Furthermore, the base station 10 can control the retransmission and destination of the terminal 20 in the sidelink communication.

(Proposal C)

For example, the terminal 20 that has received a DCI from the base station 10 may select a value of a HARQ process ID and a value of an NDI to be included in an SCI independently of the value of the HARQ process ID and the value of NDI included in the received DCI. That is, the terminal 20 may determine that the HPN and NDI included in the DCI received from the base station 10 are recommendations from the base station 10, and the terminal 20 itself may autonomously select the HARQ process ID value and NDI value to be finally included in the SCI. For example, the sidelink schedule may be assumed to be based on at least one of the Scheduling Request (SR) or the Buffer Status Report (BSR) transmitted from the terminal 20 to the base station 10.

(C-1)

For example, if an NDI included in a received DCI is toggled, the terminal 20 that has received the DCI from the base station 10 may transmit new data on the sidelink resource scheduled by the DCI, or may perform retransmission on the sidelink resource scheduled by the DCI.

(C-2)

For example, if an NDI included in a received DCI is not toggled, the terminal 20 that has received the DCI from the base station 10 may transmit new data on the sidelink resource scheduled by the DCI, or may perform retransmission on the sidelink resource scheduled by the DCI.

According to Proposal C described above, the terminal 20 can determine whether the terminal 20 is to perform retransmission, based on success or failure of an actual data reception in sidelink.

In the above-described embodiments, "destination" may mean a destination ID.

In the above-described embodiments, from the viewpoint of the transmitting terminal 20, the maximum value of the HARQ processes of the sidelink communication per destination may be a fixed value (which may be any one of 1, 2, 4, 8, 16, and 32, for example), may be preconfigured, or may depend on the implementation of the terminal 20. Alternatively, "per destination" may be replaced with "for all destinations." The maximum values of the HARQ process may be different for respective cast types (Broadcast, Groupcast, and Unicast), or may be different for respective destinations.

In the above-described embodiments, for example, in the case of Unicast, the maximum value of the HPN in the sidelink may be configured by PC5-RRC, which is the sidelink RRC.

In the above-described embodiments, from the viewpoint of the receiving terminal 20, the maximum value of the HARQ processes of the sidelink communication per destination may be a fixed value (which may be any one of 1, 2, 4, 8, 16, and 32, for example), may be preconfigured, or may depend on the implementation of the terminal 20. Alternatively, "per destination" may be replaced with "for all destinations."

In the above-described embodiments, a notification of the maximum value of the HARQ processes of the sidelink communication per destination may be transmitted to the base station 10, as the UE capability.

(Device Configuration)

Next, a functional configuration example of the base station 10 and the terminal 20 that perform the processing operations described above is described.

<Base Station 10>

Figure 11:
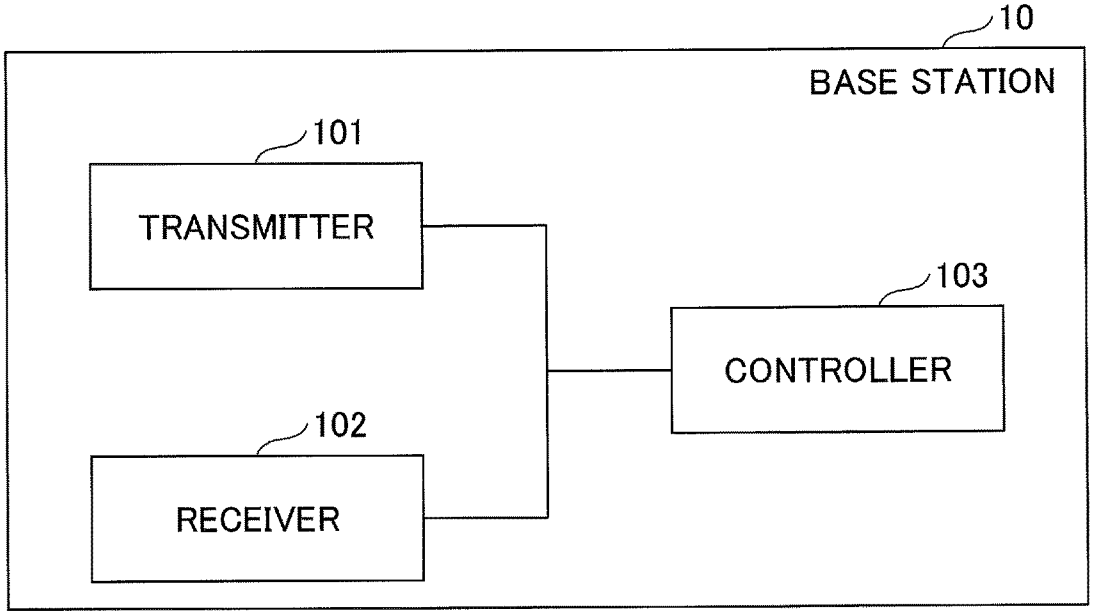
FIG. 11 is a diagram illustrating an example of a functional configuration of a base station according to an embodiment.

FIG. 11 is a diagram illustrating an example of a functional configuration of the base station 10. As illustrated in FIG. 11, the base station 10 includes a transmitter 101, a receiver 102, and a controller 103. The functional configuration illustrated in FIG. 11 is merely one example. The functional division and names of functional units may be any division and names, provided that the operation according to the embodiments of the present invention can be performed. Note that the transmitter 101 may be referred to as a transmitting device, and the receiver 102 may be referred to as a receiving device.

The transmitter 101 includes a function for generating a signal to be transmitted to the terminal 20 and wirelessly transmitting the signal. The receiver 102 includes a function for receiving various types of signals wirelessly transmitted from the terminal 20 and obtaining a higher layer signal from the received signal. Furthermore, the receiver 102 includes a function for measuring a received signal to obtain a quality value.

The controller 103 controls the base station 10. Note that a function of the controller 103 related to transmission may be included in the transmitter 101 and a function of the controller 103 related to reception may be included in the receiver 102.

For example, the controller 103 of the base station 10 configures sidelink communication schedule information including an NDI and an HPN for the terminal 20, and the transmitter 101 transmits the schedule information to the terminal 20.

For example, the controller 103 of the base station 10 configures sidelink communication schedule information including the HPN associated with the destination of the sidelink communication by the terminal 20, and the transmitter 101 transmits the schedule information to the terminal 20.

<Terminal 20>

Figure 12:
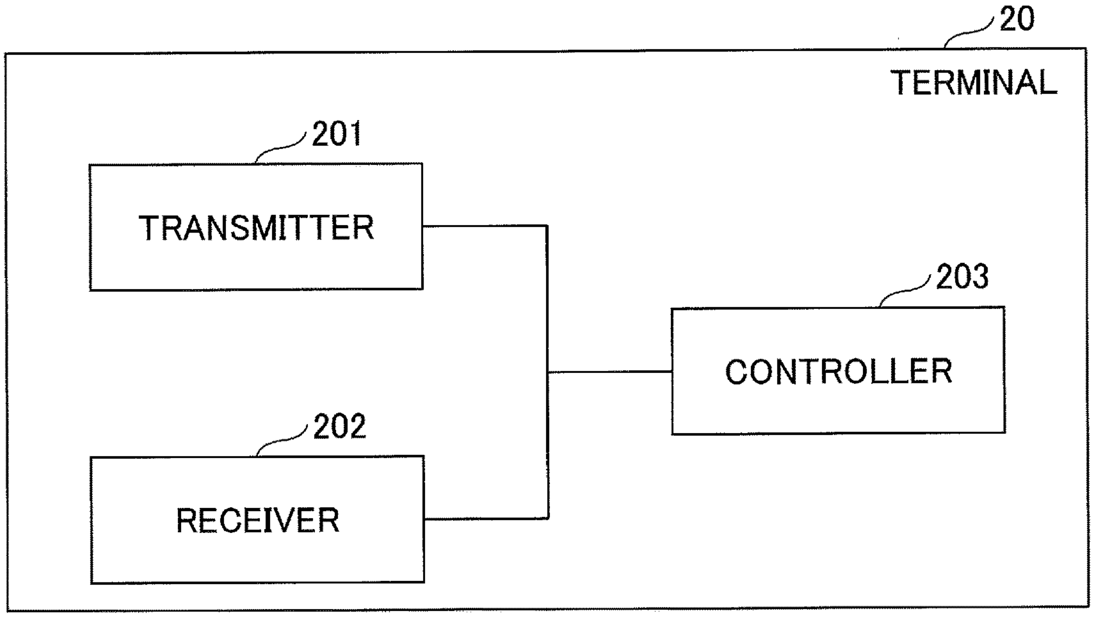
FIG. 12 is a diagram illustrating an example of a functional configuration of a terminal according to an embodiment.

FIG. 12 is a diagram illustrating an example of a functional configuration of the terminal 20. As illustrated in FIG. 12, the terminal 20 includes a transmitter 201, a receiver 202, and a controller 203. The functional configuration illustrated in FIG. 12 is merely an example. The functional division and names of functional units may be any division and names, provided that the operation according to the embodiments can be performed. Note that the transmitter 201 may be referred to as a transmitting device, and the receiver 202 may be referred to as a receiving device.

Furthermore, the terminal 20 may be the transmitting terminal 20A or the receiving terminal 20B. Additionally, the terminal 20 may be the scheduling terminal 20.

The transmitter 201 generates a transmitting signal from transmitting data and transmits the transmitting signal through radio. The receiver 202 receives various types of signals and obtains a higher layer signal from the received physical layer signal. The receiver 202 includes a function for measuring a received signal and obtaining a quality value.

The controller 203 controls of the terminal 20. Note that the function of the controller 203 related to transmission may be included in the transmitter 201, and the function of the controller 203 related to reception may be included in the receiver 202.

For example, the receiver 202 of the terminal 20 receives sidelink communication schedule information including the NDI and the HPN transmitted from the base station 10, the controller 203 of the terminal 20 sets an NDI and an HPN to be included in control information for the sidelink communication based on the NDI and the HPN included in the schedule information received by the receiver 202, and the transmitter 201 transmits the control information for the sidelink communication including the NDI and the HPN set by the controller 203 to the receiving terminal 20 via the sidelink.

For example, the receiver 202 of the terminal 20 receives sidelink communication schedule information including the HPN associated with the destination of the sidelink communication by the terminal 20 transmitted from the base station 10, the controller 203 sets the destination of the data in the sidelink communication based on the HPN included in the schedule information received by the receiver 202, and the transmitter 201 transmits the data to the destination set by the controller 203 via the sidelink.

For example, the receiver 202 of the terminal receives the sidelink communication schedule information including the NDI and the HPN from the base station 10, the controller 203 of the terminal 20 autonomously sets the NDI and the HPN to be included in the control information for the sidelink communication regardless of the value of the NDI and the value of the HPN included in the schedule information received by the receiver 202, and the transmitter 201 transmits the control information for the sidelink communication including the NDI and the HPN set by the controller 203 to the receiving terminal 20 via the sidelink.

<Hardware Configuration>

The block diagrams (FIG. 11 to FIG. 12) used for the description of the above embodiments illustrate blocks of functional units. These functional blocks (components) are implemented by any combination of at least one of hardware or software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 13:
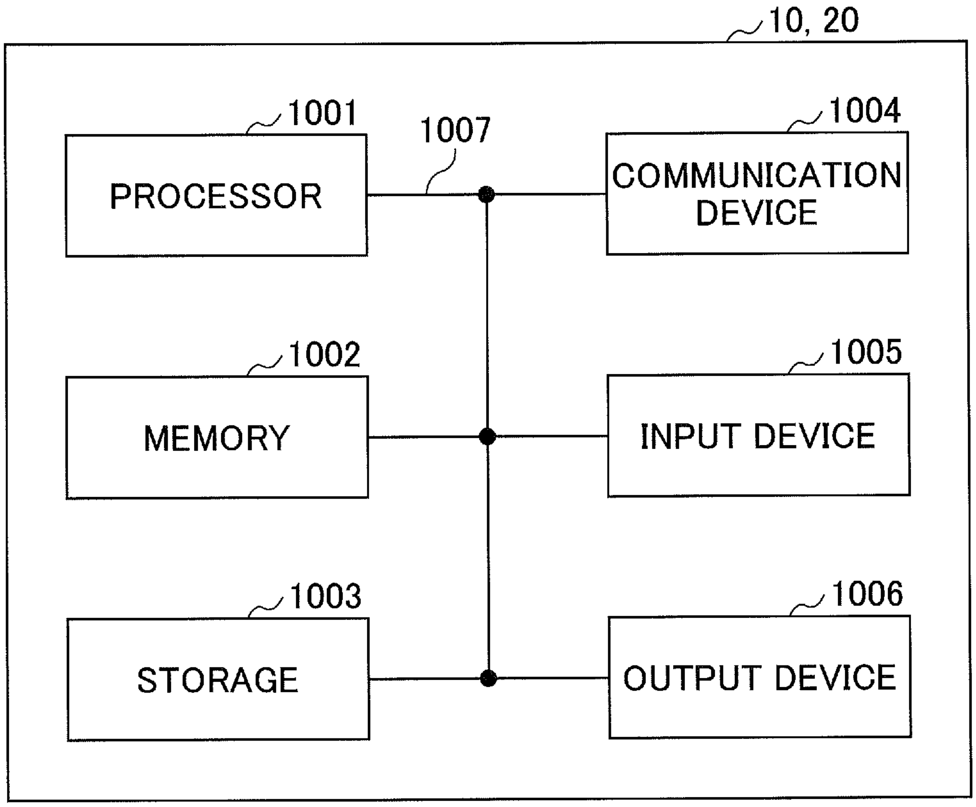
FIG. 13 is a diagram illustrating an example of a hardware configuration of the base station and the terminal according to an embodiment.

For example, the terminal 20 and the base station 10 according to the embodiments of the present invention may function as computers performing the process of the radio communication according to the embodiments of the present invention. FIG. 13 is a diagram illustrating an example of a hardware configuration of the terminal 20 and the base station 10 according to the embodiment. Each of the above-described terminal 20 and the base station 10 may be physically configured as a computer device including a processor 1001, a memory 1002, a storage 1003, a communication device 1004, an input device 1005, an output device 1006, a bus 1007, or the like.

Note that, in the following description, the term "device" can be replaced with a circuit, a device, a unit, or the like. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, or the like.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the controller 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), and a Random Access Memory (RAM). The memory 1002 may be referred to as a register, a cache, a main memory (main storage device), or the like. The memory 1002 may store a program (program code), a software module, or the like, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, or a magnetic strip. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The terminal 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

Conclusion of the Embodiments

In this specification, at least the following terminal, base station, and communication method are disclosed.

A terminal including a receiver that receives schedule information for a sidelink communication; and a controller that executes at least one operation of setting a New Data Indicator (NDI) and/or a Hybrid Automatic Repeat Request process number (HPN) to be included in control information for the sidelink communication based on a NDI and/or a HPN included in the schedule information, or autonomously setting an NDI and an HPN to be included in the control information for the sidelink communication independently of the NDI and the HPN included in the schedule information.

According to the above-described configuration, the control method of the HPN and NDI in the RA mode 1 can be clarified.

Upon detecting that the NDI included in the schedule information for the sidelink communication is toggled, the controller may perform the operation of autonomously setting the NDI and the HPN to be included in the control information for the sidelink communication independently of the NDI and the HPN included in the schedule information.

According to the above-described configuration, the control method of the HPN and the NDI in the RA mode 1 can be clarified.

Upon detecting that the NDI included in the schedule information for the sidelink communication is toggled and the HPN included in the schedule information for the sidelink communication is associated with a destination of the sidelink communication, the controller may set the destination of the sidelink communication associated with the HPN, as a destination of new data to be transmitted via the sidelink.

According to the above-described configuration, the control method of the HPN and the NDI in the RA mode 1 can be clarified. Furthermore, the base station can specify the destination of the data in the sidelink communication by the terminal.

Upon detecting that the NDI included in the schedule information for the sidelink communication is toggled, the controller may select at least one of transmission of new data to a specific destination on the scheduled sidelink resource, or retransmission of data previously transmitted via the sidelink to the specific destination on the scheduled sidelink resource.

According to the above-described configuration, even if the NDI included in the schedule information received from the base station is toggled, the terminal can autonomously choose to retransmit data previously transmitted via the sidelink.

A communication method executed by a terminal, the method including receiving schedule information for a sidelink communication; and executing at least one operation of setting a New Data Indicator (NDI) and/or a Hybrid Automatic Repeat Request process number (HPN) to be included in control information for the sidelink communication based on a NDI and/or a HPN included in the schedule information, or autonomously setting an NDI and an HPN to be included in the control information for the sidelink communication independently of the NDI and the HPN included in the schedule information.

According to the above-described configuration, the control method of the HPN and the NDI in the RA mode 1 can be clarified.

A base station including a controller that includes, in schedule information for a sidelink communication, one of a New Data Indicator (NDI) and/or a Hybrid Automatic Repeat Request process number (HPN) for controlling the sidelink communication by a terminal, or the NDI and/or the HPN as reference information for the sidelink communication by the terminal; and a transmitter that transmits the schedule information for the sidelink communication to the terminal.

According to the above-described configuration, the base station can select the NDI and/or HPN for controlling the sidelink communication by the terminal or the NDI and/or HPN as reference information for the sidelink communication by the terminal, as the NDI and/or HPN included in the schedule information for the sidelink communication.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (as long as there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no contradiction.

For the convenience of the description of the process, the terminal 20 and the base station 10 are described using functional block diagrams, but such devices may be implemented in hardware, software, or a combination thereof. Software operated by a processor included in the terminal 20 in accordance with the embodiments of the present invention and software operated by a processor included in the base station 10 in accordance with the embodiments of the present invention may be stored in a random access memory (RAM), a flash memory, a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB),"

"gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base station and the user terminal is replaced with communication between multiple user terminals (e.g., may be referred to as Device-to-Device (D2D) or Vehicle-to-Everything (V2X)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standard applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (Orthogonal Frequency Division Multiplexing (OFDM) symbols, Single Carrier Frequency Division Multiple Access (SC-FDMA) symbols). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth, or transmission power that can be used in each user terminal) in units of TTIs to each user terminal. Note that the definition of the TTI is not limited to this.

The TTI may be a transmission time unit, such as a channel coded data packet (transport block), a code block, and a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A Bandwidth Part (BWP), which may be referred to as a partial bandwidth, or the like, may represent a subset of consecutive common resource blocks (RBs) for a particular neurology in a particular carrier. Here, the common RB may be specified by an index of the RB based on the common reference point of the carrier. PRBs are defined in a BWP and may be numbered within that BWP.

The BWP may include a BWP for UL (UL BWP) and a BWP for DL (DL BWP). One or more BWPs may be configured in one carrier for the UE.

At least one of the configured BWPs may be active, and the UE may not expect to transmit or receive a predetermined signal/channel outside the active BWP. In this disclosure, "cell," "carrier" and the like may be replaced with "BWP."

The structures of the radio frame, subframe, slot, mini-slot, symbol, and the like described above are for exemplary purpose only. For example, the number of subframes included in the radio frame, the number of slots per subframe or radio frame, the number of mini-slots included in the slots, the number of symbols and RBs included in the slots or mini-slots, the number of subcarriers included in the RBs, and the number of symbols, symbol length, and cyclic prefix (CP) length in the TTI may be varied in various ways.

In the present disclosure, for example, if an article is added by translation, such as "a," "an," and "the" in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in this specification. The present invention may be implemented as modifications and variations without departing from the gist and scope of the present invention as defined by the claims. Accordingly, the description of this specification is for illustrative purposes only and is not intended to have any restrictive meaning with respect to the present invention.

LIST OF REFERENCE SYMBOLS

10 base station
20 terminal
101 transmitter
102 receiver
103 controller
201 transmitter
202 receiver
203 controller
1001 processor
1002 memory
1003 storage
1004 communication device
1005 input device
1006 output device

The invention claimed is:

1. A terminal comprising:

a controller that sets a maximum value of a HARQ process number for all destinations of inter-terminal communication being sidelink, the maximum value of the HARQ process number being to be transmitted to a base station as a terminal capability;

a receiver that receives, from the base station, a HARQ process number and a new data indicator, the HARQ process number and the new data indicator being to be used to schedule the inter-terminal communication; and a transmitter, wherein, if the new data indicator is not toggled, the transmitter retransmits data to a receiving terminal by using an inter-terminal communication process number that corresponds to a HARQ process number that is same as the HARQ process number used for previous transmission of the data, wherein, if the new data indicator is toggled, the transmitter transmits new data to the receiving terminal by using an inter-terminal communication number that is newly set, wherein the transmitter transmits, to the base station, the terminal capability including the maximum value of the HARQ process number for all the destinations of the inter-terminal communication, wherein the HARQ process number and the new data indicator are included in a downlink control information (DCI) format 3_0, wherein the DCI format 3_0 includes an index of a subchannel, and wherein the controller sets a HARQ process number and a new data indicator, which are indicated by Medium Access Control (MAC), to be included in second-stage Sidelink Control Information based on the HARQ process number and the new data indicator included in the DCI format 3_0.

2. The terminal according to claim 1, wherein a maximum value of a HARQ process number in the receiving terminal is a fixed number.

3. A base station comprising:

a receiver that receives, from a terminal, a maximum value of a HARQ process number for all destinations of inter-terminal communication being sidelink, the maximum value of the HARQ process number being transmitted as a terminal capability; and a transmitter that transmits, to the terminal, a HARQ process number and a new data indicator, the HARQ process number and the new data indicator being to be used for scheduling the inter-terminal communication, wherein the HARQ process number and the new data indicator are included in a downlink control information (DCI) format 3_0, wherein the DCI format 3_0 includes an index of a subchannel, and wherein the terminal sets a HARQ process number and a new data indicator, which are indicated by Medium Access Control (MAC), to be included in second-stage Sidelink Control Information based on the HARQ process number and the new data indicator included in the DCI format 3_0.

4. A communication system comprising:

a base station; and a terminal, wherein the base station includes:

a receiver that receives, from a terminal, a maximum value of a HARQ process number for all destinations of inter-terminal communication being sidelink, the maximum value of the HARQ process number being transmitted as a terminal capability, and a transmitter that transmits, to a terminal, a HARQ process number and a new data indicator, the HARQ process number and the new data indicator being to be used for scheduling the inter-terminal communication, and wherein the terminal includes a controller that sets the maximum value of the HARQ process number for all the destinations of the inter-terminal communication, the maximum value of the HARQ process number being to be transmitted to the base station as the terminal capability, a receiver that receives, from the base station, the HARQ process number and the new data indicator, the HARQ process number and the new data indicator being to be used to schedule the inter-terminal communication; and a transmitter, wherein, if the new data indicator is not toggled, the transmitter retransmits data to a receiving terminal by using an inter-terminal communication process number that corresponds to a HARQ process number that is same as the HARQ process number used for previous transmission of the data, wherein, if the new data indicator is toggled, the transmitter transmits new data to the receiving terminal by using an inter-terminal communication number that is newly set, wherein the transmitter of the terminal transmits, to the base station, the terminal capability including the maximum value of the HARQ process number for all the destinations of the inter-terminal communication, wherein the HARQ process number and the new data indicator are included in a downlink control information (DCI) format 3_0, wherein the DCI format 3_0 includes an index of a subchannel, and wherein the controller sets a HARQ process number and a new data indicator, which are indicated by Medium Access Control (MAC), to be included in second-stage Sidelink Control Information based on the HARQ process number and the new data indicator included in the DCI format 3_0.

5. A communication method executed by a terminal, the method comprising:

setting a maximum value of a HARQ process number for all destinations of inter-terminal communication being sidelink, the maximum value of the HARQ process number being to be transmitted to a base station as a terminal capability;

receiving, from the base station, a HARQ process number and a new data indicator, the HARQ process number and the new data indicator being to be used to schedule the inter-terminal communication;

transmitting, wherein, if the new data indicator is not toggled, the transmitting retransmits data to a receiving terminal by using an inter-terminal communication process number that corresponds to a HARQ process number that is same as the HARQ process number used for previous transmission of the data, and wherein, if the new data indicator is toggled, the transmitting transmits new data to the receiving terminal by using an inter-terminal communication number that is newly set; and transmitting, to the base station, the terminal capability including the maximum value of the HARQ process number for all the destinations of the inter-terminal communication, wherein the HARQ process number and the new data indicator are included in a downlink control information (DCI) format 3_0, wherein the DCI format 3_0 includes an index of a subchannel, and wherein the terminal sets a HARQ process number and a new data indicator, which are indicated by Medium Access Control (MAC), to be included in second-stage Sidelink Control Information based on the HARQ process number and the new data indicator included in the DCI format 3_0.

* * * * *